US012725288B2

(12) United States Patent
Hong et al.

(10) Patent No.: US 12,725,288 B2
(45) Date of Patent: Sep. 1, 2026

(54) DEPTH IMAGE GENERATION METHOD AND APPARATUS, REFERENCE IMAGE GENERATION METHOD AND APPARATUS, ELECTRONIC DEVICE, AND COMPUTER-READABLE STORAGE MEDIUM

(71) Applicant: Tencent Technology (Shenzhen) Company Limited, Shenzhen (CN)

(72) Inventors: Zheming Hong, Shenzhen (CN); Jun Wang, Shenzhen (CN); Shaoming Wang, Shenzhen (CN); Runzeng Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 799 days.

(21) Appl. No.: 17/736,899

(22) Filed: May 4, 2022

(65) Prior Publication Data

US 2022/0262026 A1 Aug. 18, 2022

Related U.S. Application Data

(63) Continuation of application No. PCT/CN2021/100350, filed on Jun. 16, 2021.

(30) Foreign Application Priority Data

Jul. 28, 2020 (CN) ........................ 202010739666.4

(51) Int. Cl.
*G06T 7/55* (2017.01)
*G06T 7/33* (2017.01)
*G06T 7/90* (2017.01)

(52) U.S. Cl.
CPC ................ *G06T 7/55* (2017.01); *G06T 7/337* (2017.01); *G06T 7/90* (2017.01)

(58) Field of Classification Search
CPC .. G06T 7/55; G06T 7/337; G06T 7/90; G06T 7/521; H04N 13/271
See application file for complete search history.

(56) References Cited

U.S. PATENT DOCUMENTS 9,361,698 B1 * 6/2016 Song ........................ G06T 7/521
11,262,192 B2 * 3/2022 Shi ..................... G01B 11/2545
(Continued)

FOREIGN PATENT DOCUMENTS

CN 103024419 A 4/2013
CN 105306922 A 2/2016
(Continued)

OTHER PUBLICATIONS

"Krzesłowski Novel calibration procedure for SVBRDF estimation of 3D objects using directional illumination and structured light projection, Proc. SPIE 8650, Three-Dimensional Image Processing (3DIP) and Applications 2013, 86500G, pp. 1-12" (Year: 2013).*
(Continued)

*Primary Examiner* — Ming Y Hon
*Assistant Examiner* — Dominique James
(74) *Attorney, Agent, or Firm* — Morgan, Lewis & Bockius LLP

(57) ABSTRACT

This application relates to a depth image generation method, a reference image generation method, and an electronic device. The depth image generation method includes: emitting structured light to a reference plane, and imaging the reference plane onto a plurality of first effective pixels and a plurality of second effective pixels of an image sensor to obtain a reference image. The method includes emitting the structured light to a target object, and imaging the target
(Continued)

Emit structured light to a reference plane, and image the reference plane onto a plurality of first effective pixels and at least part of a plurality of second effective pixels of an image sensor to obtain a reference image — S410

Emit the structured light to a target object, and image the target object onto the plurality of first effective pixels to obtain a target image — S420

Obtain a depth image of the target object based on the target image and the reference image — S430 object to the plurality of first effective pixels to obtain a target image. The method includes generating a depth image of the target object based on the target image and the reference image.

17 Claims, 8 Drawing Sheets

(56) References Cited

U.S. PATENT DOCUMENTS

| | | | |
|---|---|---|---|
| 2012/0262553 | A1 | 10/2012 | Chen et al. |
| 2019/0295271 | A1 | 9/2019 | Xu et al. |

FOREIGN PATENT DOCUMENTS

| | | | | | |
|---|---|---|---|---|---|
| CN | 106875435 | A | | 6/2017 | |
| CN | 108711167 | A | | 10/2018 | |
| CN | 109961406 | A | | 7/2019 | |
| CN | 110400341 | A | * | 11/2019 | ............. G06T 7/521 |
| CN | 112752088 | A | | 5/2021 | |
| EP | 3481062 | A1 | | 5/2019 | |

OTHER PUBLICATIONS

"Jia et al., Scene depth perception based on omnidirectional structured light, IEEE Transactions on image processing 25.9 (2016), pp. 4369-4378" (Year: 2016).*

Tencent Technology, India Office Action, 202247029903, Sep. 21, 2023, 6 pgs.

Jason Geng, "Structured-light 3D Surface Imaging: A Tutorial", Advances in Optics and Photonics, IEEE Intelligent Transportation System Society, vol. 3, No. 2, Mar. 31, 2011, XP055556182, 33 pgs.

Gdeisat M A et al., "Spatial and Temporal Carrier Fringe Pattern Demodulation Using the One-Dimensional Continuous Wavelet Transform: Recent Progress, Challenges, and Suggested Developments", Optics and Lasers in Engineering, Elsevier, Amsterdam, vol. 47, No. 12, Dec. 1, 2009, XP026669792, 14 pgs.

Tencent Technology, Extended European Search Report, EP21849480.5, Jan. 2, 2023, 11 pgs.

Tencent Technology, ISR, PCT/CN2021/100350, Aug. 26, 2021, 2 pgs.

Tencent Technology, WO, PCT/CN2021/100350, Aug. 26, 2021, 5 pgs.

Tencent Technology, IPRP, PCT/CN2021/100350, Jan. 31, 2023, 6 pgs.

* cited by examiner

DEPTH IMAGE GENERATION METHOD AND APPARATUS, REFERENCE IMAGE GENERATION METHOD AND APPARATUS, ELECTRONIC DEVICE, AND COMPUTER-READABLE STORAGE MEDIUM

CROSS-REFERENCE TO RELATED APPLICATIONS

This application is a continuation application of PCT Patent Application No. PCT/CN2021/100350, entitled "DEPTH IMAGE GENERATION METHOD AND APPARATUS, REFERENCE IMAGE GENERATION METHOD AND APPARATUS, ELECTRONIC DEVICE, AND COMPUTER READABLE STORAGE MEDIUM" filed on Jun. 16, 2021, which claims priority to Chinese Patent Application No. 202010739666.4, filed with the State Intellectual Property Office of the People's Republic of China on Jul. 28, 2020, and entitled "DEPTH IMAGE GENERATION METHOD AND APPARATUS, REFERENCE IMAGE GENERATION METHOD, AND ELECTRONIC DEVICE", all of which are incorporated herein by reference in their entirety.

FIELD OF THE TECHNOLOGY

This application relates to the field of depth imaging technologies, and specifically, to a depth image generation method, a depth image generation apparatus, a reference image generation method, a reference image generation apparatus, an electronic device, and a computer-readable storage medium.

BACKGROUND OF THE DISCLOSURE

With the development of computer vision, the conventional computer vision technology based on two-dimensional color image processing has been unable to meet people's requirements for applying the computer vision to the three-dimensional physical world. As images that can directly reflect distance information of objects, depth images have been increasingly used.

However, in the related art, part of depth images may have a black border, which affects their application in some fields. For example, in a face authentication process, a face depth image can be introduced to improve the accuracy of authentication results. However, if a part of a user's face is located in a black edge of the above-mentioned depth image, the face authentication may fail.

The information disclosed in the above background part is used only for enhancing the understanding of the background of this application, and therefore may include information that does not constitute the related art known to a person of ordinary skill in the art.

SUMMARY

According to various embodiments provided in this application, a depth image generation method, a depth image generation apparatus, a reference image generation method, a reference image generation apparatus, an electronic device, and a computer-readable storage medium are provided.

According to one aspect of this application, a depth image generation method is provided, including: emitting structured light to a reference plane, and imaging the reference plane onto a plurality of first effective pixels and a plurality of second effective pixels of an image sensor to obtain a reference image; emitting the structured light to a target object, and imaging the target object onto the plurality of first effective pixels to obtain a target image; and generating a depth image of the target object based on the target image and the reference image.

According to one aspect of this application, a depth image generation method is provided, including: emitting structured light to a target object, and imaging the target object onto a plurality of first effective pixels of an image sensor to obtain a target image; and generating a depth image of the target object according to the target image and a reference image, the reference image is obtained by imaging a reference plane onto the plurality of first effective pixels and a plurality of second effective pixels of the image sensor.

According to one aspect of this application, a reference image generation method is provided, including: emitting structured light to a reference plane, and imaging the reference plane onto a first plurality of effective pixels and a second plurality of effective pixels of an image sensor to obtain a reference image, the plurality of first effective pixels is an effective pixel used when depth imaging is performed on a target object.

According to one aspect of this application, a depth image generation apparatus is provided, including: a reference image generation module, configured to emit structured light to a reference plane, and perform imaging on the reference plane by using a first effective pixel and a second effective pixel of an image sensor, to obtain a reference image; a target image obtaining module, configured to emit the structured light to a target object, and perform imaging on the target object by using the first effective pixel, to obtain a target image; and a depth image generation module, configured to obtain a depth image of the target object according to the target image and the reference image.

According to one aspect of this application, a depth image generation apparatus is provided, including: a target image obtaining module, configured to emit structured light to a target object, and perform imaging on the target object by using a first effective pixel of an image sensor, to obtain a target image; and a depth image generation module, configured to obtain a depth image of the target object according to the target image and a reference image, the reference image being obtained by performing imaging on a reference plane by using the first effective pixel and a second effective pixel of the image sensor.

According to one aspect of this application, a reference image generation apparatus is provided, including: a reference image generation module, configured to emit structured light to a reference plane, and perform imaging on the reference plane by using a first effective pixel and a second effective pixel of an image sensor, to obtain a reference image, the first effective pixel being an effective pixel used when depth imaging is performed on a target object.

According to one aspect of this application, an electronic device is provided, including: a processor; and a memory, configured to store executable instructions of the processor, the processor being configured to perform the method according to any one of the above aspects by executing the executable instructions.

According to one aspect of this application, a computer-readable storage medium is provided, storing a computer program, the computer program, when executed by a processor, implementing any one of the foregoing methods.

According to one aspect of this application, a computer program product or a computer program is provided, the computer program product or the computer program including computer instructions, the computer instructions being stored in a computer-readable storage medium. A processor of a computer device reads the computer instructions from the computer-readable storage medium, and the processor executes the computer instructions, so that the computer device performs the method provided in the various optional implementations.

Exemplary embodiments of this application may have part or all of the following beneficial effects:

According to the depth image generation method provided based on exemplary implementations of this application, during a process of generating a reference image, a plurality of second effective pixels that is not used in the related art is also used while a plurality of first effective pixels is used, so that a size of the generated reference image can be increased. A main reason of occurring a black edge phenomenon is that, pixels of an edge of a target image have no corresponding pixel in the reference image. In the depth image generation method provided in the exemplary implementations of this application, because the size of the reference image is increased, part or all of pixels of the edge of the target image can match corresponding pixels in the reference image, thereby reducing or preventing a depth image from occurring the black edge phenomenon to a certain extent.

It is to be understood that, the foregoing general descriptions and the following detailed descriptions are merely for illustration and explanation purposes and are not intended to limit this application.

BRIEF DESCRIPTION OF THE DRAWINGS

Accompanying drawings herein are incorporated into this specification and constitute a part of this specification, show embodiments that conform to this application, and are used for describing a principle of this application together with this specification. Apparently, the accompanying drawings described below are only some embodiments of this application. A person of ordinary skill in the art may still derive other drawings from these accompanying drawings without creative efforts.

DESCRIPTION OF EMBODIMENTS

Figure 1:
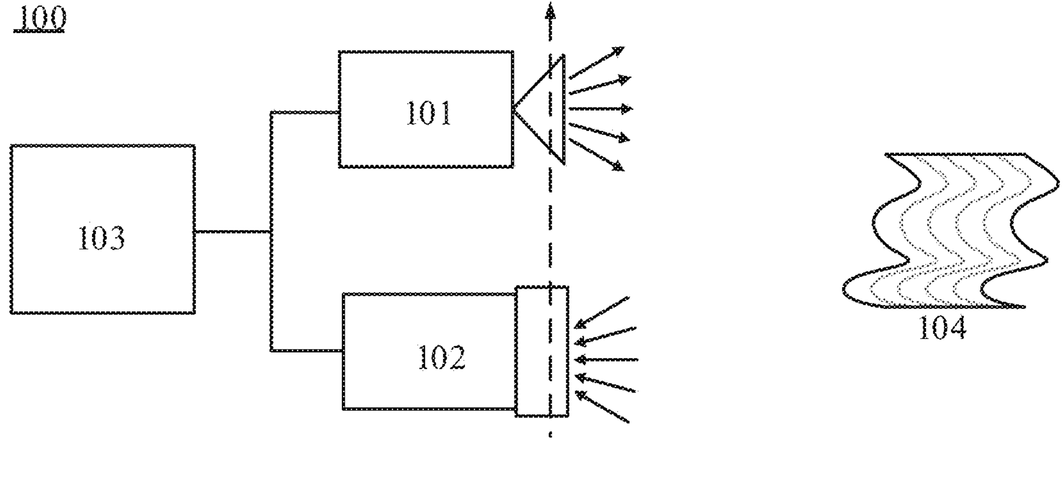
FIG. 1 is a schematic structural diagram of a depth imaging system to which an embodiment of this application is applicable.

At present, the examples of implementations are described comprehensively with reference to the accompanying drawings. However, the examples of implementations may be implemented in multiple forms, and it should not be understood as being limited to the examples of implementations described herein. Conversely, the implementations are provided to make this application more comprehensive and complete, and comprehensively convey the idea of the examples of the implementations to a person skilled in the art. The described features, structures, or characteristics may be combined in one or more implementations in any appropriate manner. In the following description, many specific details are provided to give a full understanding of the implementations of this application. However, it is to be appreciated by a person skilled in the art that one or more of the specific details may be omitted during practice of the technical solutions of this application, or other methods, components, apparatus, steps, or the like may be used. In other cases, well-known technical solutions are not shown or described in detail to avoid overwhelming the subject and thus obscuring various aspects of this application.

In addition, the accompanying drawings are only schematic illustrations of this application and are not necessarily drawn to scale. A same reference numeral in the accompanying drawings represents same or similar components, and therefore repeated descriptions of the components are appropriately omitted. Some of the block diagrams shown in the accompanying drawings are functional entities and do not necessarily correspond to physically or logically independent entities. That is, the functional entities may be implemented in a software form, or in one or more hardware modules or integrated circuits, or in different networks and/or processor apparatuses and/or microcontroller apparatuses.

FIG. 1 is a schematic structural diagram of a depth imaging system 100 provided by the inventor. The depth imaging system 100 shown in FIG. 1 mainly includes a structured light projection module 101, an image sensor 102, and a processing module 103. The depth imaging system may be configured to perform depth imaging on a target object 104, to obtain a corresponding depth image. The target object 104 may be a face or another object on which imaging is to be performed.

The structured light projection module 101 may include a light source and an optical component. The light source may be a laser diode, a semiconductor laser, or the like, or an edge-emitting laser, a vertical cavity surface laser emitter, a corresponding array laser, or the like; and a wavelength of emergent light of the light source may be infrared or ultraviolet. The optical component is configured to modulate a light beam emitted by the light source and then emit structured light outward; and the optical component may be a refractive optical element, a diffractive optical element, a combination of the two, or the like. In this exemplary implementation, a beam of structured light may be a beam of structured light in the encoding form of a speckle, a spot, a stripe, a two-dimensional pattern, or the like.

The image sensor 102 may be a charge coupled device (CCD) image sensor, a complementary metal-oxide-semiconductor (CMOS) image sensor, or the like. In addition, to facilitate collection of incident light, optical components such as a filter, a micro lens array (MLA), and the like may also be disposed on an optical path of the incident light of the image sensor 102. The filter may be a Bayer filter, an infrared filter, or the like. In addition, when a wavelength of structured light emitted by the structured light projection module 101 is λ, the filter may be configured to filter only a light beam with a wavelength λ for passing through, thereby improving the quality of subsequent images.

A connection line between the structured light projection module 101 and the image sensor 102 is referred to as a base line, for example, a direction of the base line may be an x-axis direction shown in FIG. 1. Optical shafts of the structured light projection module 101 and the image sensor 102 may be parallel or form a specific inclined angle. In this exemplary implementation, the optical shafts of the structured light projection module 101 and the image sensor 102 are parallel. Such a configuration can simplify calculation complexity during subsequent depth image generation.

The processing module 103 may include one or more processors and one or more memories, and may be configured to control the structured light projection module 101 and the image sensor 102 and receive related data for processing. The processor may include one or a combination of a digital signal processor (DSP), a multimedia application processor (MAP), a field-programmable gate array (FPGA), an application specific integrated circuit (ASIC), or the like. The memory may include one or a combination of a random access memory (RAM), a read only memory (ROM), a flash, or the like. Control and data processing instructions executed by the processing module 103 may be stored in the memory in the form of software, firmware, or the like. and be invoked by the processor when needed, or the instructions may be directly solidified into a circuit to form a dedicated circuit (or a dedicated processor) to execute corresponding instructions, or the instructions may also be implemented in the form of a combination of software and the dedicated circuit. The processing module 103 may further include an input/output interface, and/or a network interface supporting network communication. In some embodiments of this application, the processed data may be transmitted to another device or another unit in the system through the interface, for example, a display unit or an external terminal device.

Figure 2:
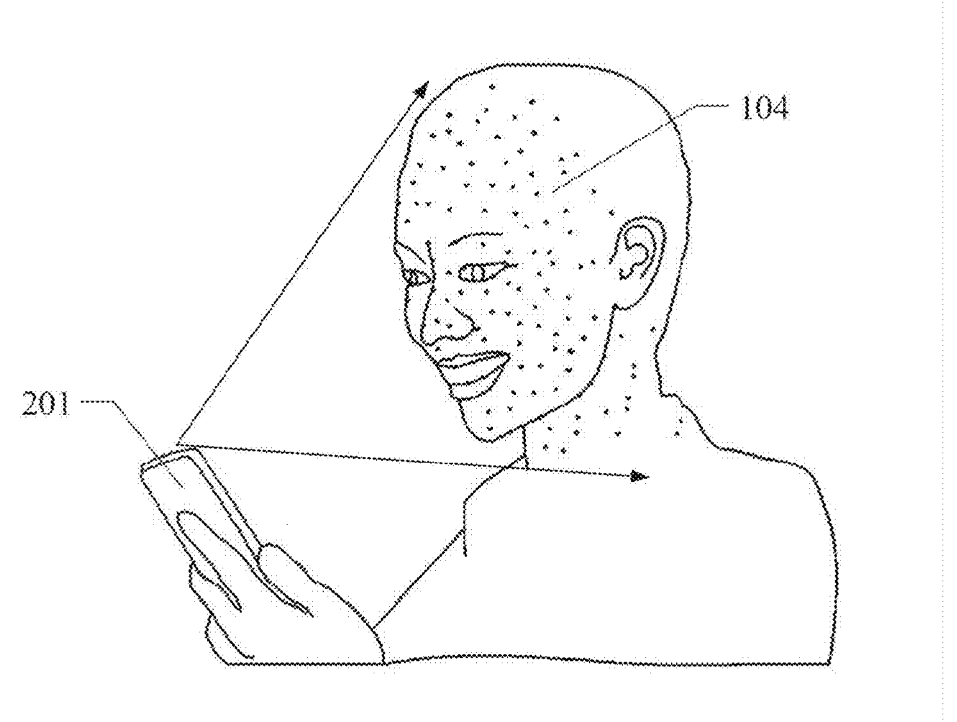
FIG. 2 is a schematic diagram of an application scenario of a depth image generation method according to an embodiment of this application.

In this exemplary implementation, the structured light projection module 101, the image sensor 102, and the processing module 103 may be disposed independently and dispersedly, or be partially or fully integrated in one electronic device. For example, the structured light projection module 101, the image sensor 102, and the processing module 103 may be integrated in a smartphone, a tablet computer, a notebook computer, or a camera. Referring to FIG. 2, the structured light projection module 101, the image sensor 102, and the processing module 103 may be integrated in a smartphone 201, and depth imaging may be performed on the target object 104 through the smartphone 201. In another example, the structured light projection module 101 and the image sensor 102 may be integrated in one electronic device, and the processing module 103 may be a cloud server, another third-party electronic device, or the like.

Based on the depth imaging system 100, in a calibration phase before delivery of a terminal device, structured light may be emitted to a reference plane by using the structured light projection module 101, and imaging is performed on the reference plane by using the image sensor 102, to obtain a reference image. During use of a user, the structured light projection module 101 emits the structured light to a target object, and performs imaging on the target object by using the image sensor 102, to obtain a target image. Further, offsets of pixels in the target image relative to corresponding pixels in the reference image may be calculated, and depth information corresponding to the pixels is calculated according to the offsets, to generate a depth image according to the depth information corresponding to the pixels.

Figure 3:
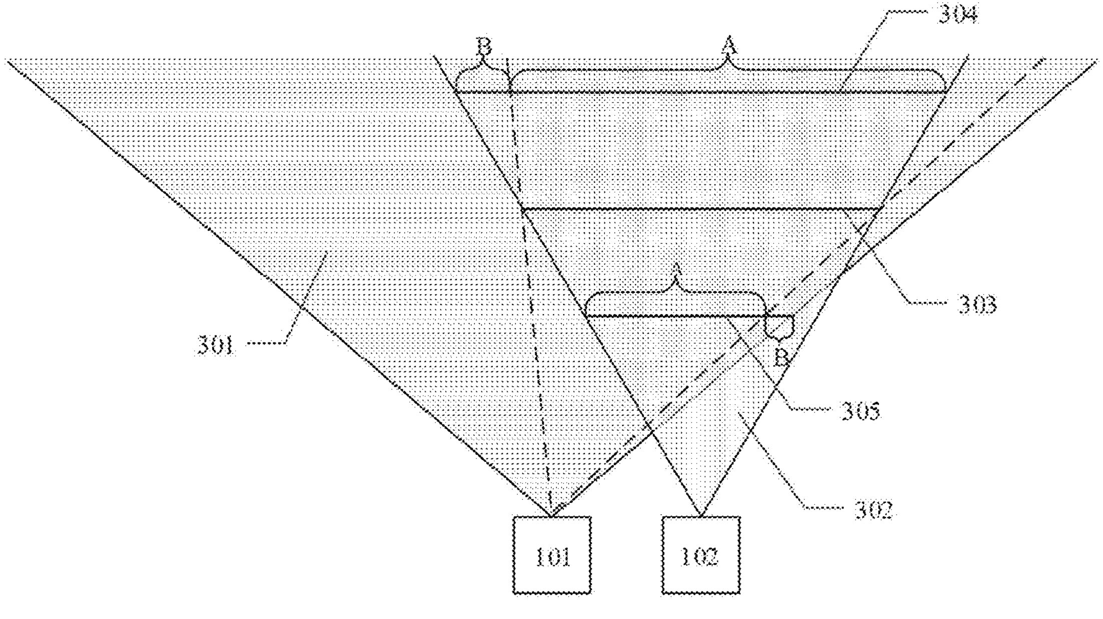
FIG. 3 is a schematic principle diagram of occurring a black edge phenomenon according to an embodiment of this application.

However, part of the depth image obtained based on the depth image generation method may occur a black edge phenomenon, which causes that some regions of the depth image are ineffective, and further affects application of the depth image in some fields. FIG. 3 is a schematic principle diagram of occurring a black edge phenomenon.

An emergent light range of the structured light projection module 101 is a region 301, and an incident light range of the image sensor 102 is a region 302. If a target object is located in an overlapped range of the region 301 and the region 302, a depth image may be generated theoretically. However, there is a specific distance between the structured light projection module 101 and the image sensor 102, and a size of a reference image 303 is fixed. Therefore, when a plane in which the target object is located is far away from a reference plane, some pixels in a target image 304 may not match corresponding pixels in the reference image 303, which causes that corresponding depth information cannot be determined. In the depth image, for the pixels of which corresponding depth information cannot be determined, 0 may be used for supplement, that is, values of the pixels of which the corresponding depth information cannot be determined are set as 0, resulting in occurrence of the black edge phenomenon.

For example, pixels of a region A of the target image 304 and a region A of a target image 305 in FIG. 3 may match corresponding pixels in the reference image 303, that is, corresponding depth information may be determined. However, pixels of a region B of the target image 304 and a region B of the target image 305 do not exist in the reference image 303, that is, corresponding depth information cannot be determined. Therefore, in the finally generated depth image, positions corresponding to the region B of the target image 304 and the region B of the target image 305 are black edges. Generally, a closer distance between a plane in which a target object is located and a reference plane indicates a smaller black edge range, and a farther distance between the plane in which the target object is located and the reference plane indicates a greater black edge range.

By using face authentication as an example, the black edge phenomenon may affect a field angle of view (FOV) during the face authentication. Meanwhile, a size of a black edge in the depth image may change with the distance, to further increase uncertainty during the authentication process. Specifically, when the face authentication is performed at different distances, black edge regions in the depth image are different, resulting in different effective regions of the face authentication. Moreover, if the user's face is located in a black edge region of the depth image, a result of the face authentication may be affected, resulting in degraded user experience. In addition, a range of the black edge region in the depth image may change with the distance, which is also difficult to be avoided by designing an effective strategy in actual applications.

Figure 4:
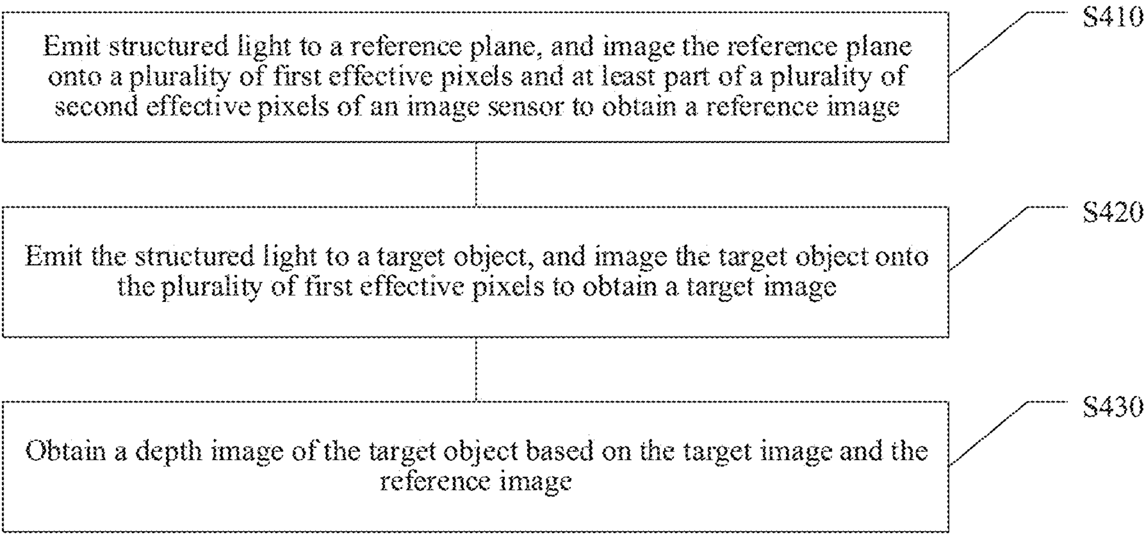
FIG. 4 is a schematic flowchart of a depth image generation method according to an embodiment of this application.

Based on the foregoing one or more problems, an exemplary implementation of this application provides a new depth image generation method. The method being applied to an electronic device is taken as an example for description. Referring to FIG. 4, the depth image generation method may include the following steps S410 to S430.

In step S410, emit structured light to a reference plane, and imaging the reference plane onto a plurality of first effective pixels and a plurality of second effective pixels of an image sensor, to obtain a reference image.

In this exemplary implementation, a structured light projection module 101 in the electronic device may be used for emitting a beam of the structured light in the encoding form of a speckle, a spot, a stripe, a two-dimensional pattern, or the like to the reference plane, and the structured light is an intersection of projection light in a known spatial direction. The reference plane may be, for example, a plane at a preset distance (for example, 0.5 m or 0.6 m) from an imaging system. Then, the electronic device may image the reference plane onto the plurality of first effective pixels and the plurality of second effective pixels of the image sensor, to obtain the reference image, where there is at least one second effective pixel, for example, the reference image may be obtained by using a part of the plurality of second effective pixels, or the reference image may also be obtained using all of the plurality of the second effective pixels. In this exemplary implementation, after the reference image is obtained, the reference image may be pre-stored in a designated storage position, for example, be stored in a memory of a terminal device or a cloud server. Step S410 is usually performed in a calibration phase before delivery of the terminal device, but may also be performed during a use phase of the terminal device or another time node. This is not specially limited in this application. The plurality of first effective pixels and the plurality of second effective pixels of the image sensor are described in detail below.

Figure 5:
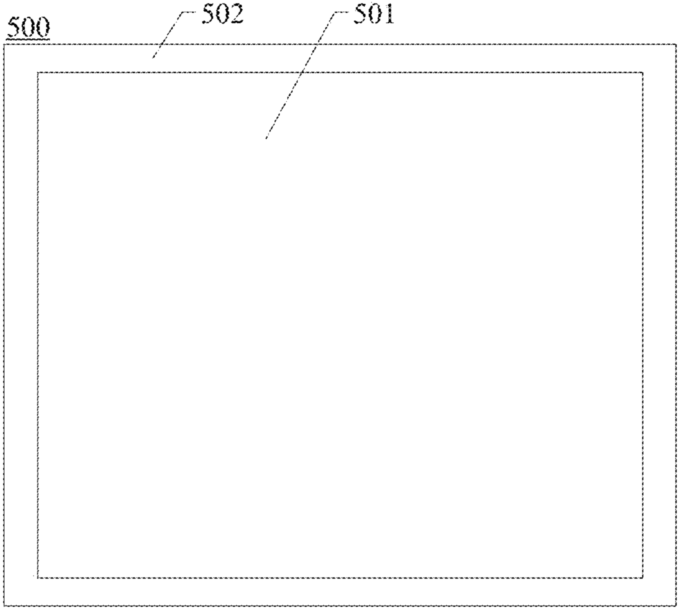
FIG. 5 is a schematic block diagram of an image sensor according to an embodiment of this application.
Figure 6:
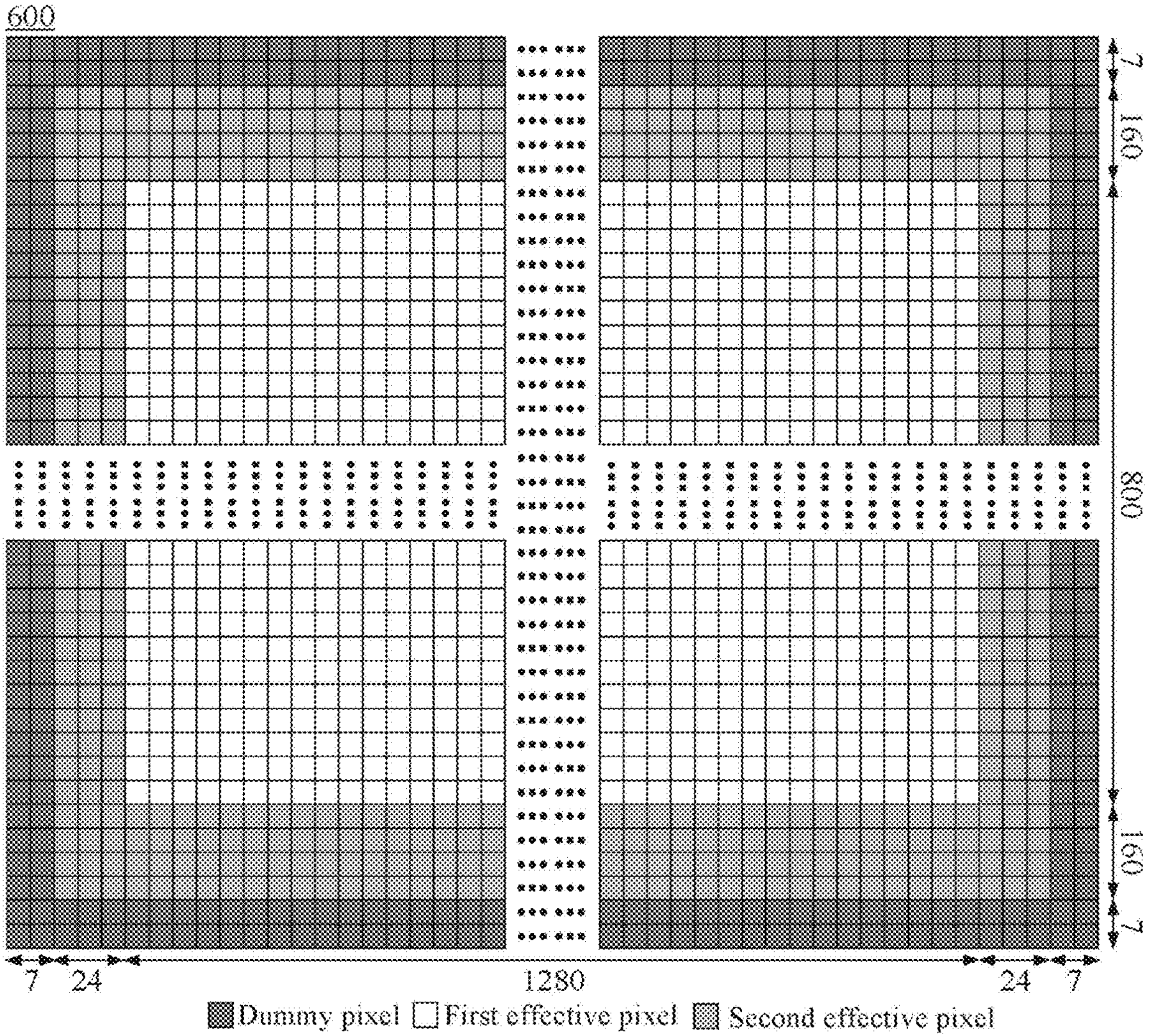
FIG. 6 is a schematic structural diagram of an image sensor according to an embodiment of this application.

Generally, referring to FIG. 5, an image sensor 500 includes an effective pixel region 501 located in a center and a dummy pixel region 502 located on a periphery of the effective pixel region 501. FIG. 6 is a schematic structural diagram of a commonly used image sensor 600. The image sensor 600 has 1344 columns and 1136 rows of pixels, namely, a total of 1526784 (1344×1136) pixels. In the 1526784 pixels, 1328 columns and 1120 rows of pixels in a center are located in an effective pixel region, namely, a total of 1487360 (1328×1120) active pixels (also referred to as effective pixels). In the 1526784 pixels, upper 8 rows, lower 8 rows, left 8 columns, and right 8 columns of pixels are located in a peripheral dummy pixel region, namely, a total of 39424 dummy pixels. The effective pixels are all pixels that can participate in imaging. The dummy pixels cannot participate in the imaging, but can be used for performing black-scale signal correction and performing interpolation on pixels of an edge of an image.

All the effective pixels can participate in the imaging. However, in actual applications, to adapt to image resolution requirements of a specific terminal, only part of the effective pixels (for example, pixels in an image window region described below) are usually configured to participate in the actual imaging, and other effective pixels do not participate in the actual imaging. Specifically, in the technical field, a "windowing" operation may be performed on the image sensor to realize a configuration on the image window region of the image sensor. The image window region is generally defined by four parameters, namely, horizontal start (HS), horizontal end (HE), vertical start (VS), and vertical end (VE); and certainly, may also be defined by less parameters, for example, be represented only through HS and VE.

Still referring to FIG. 6, in the image sensor 600, a region of pixels from a 169th row to a 968th row and from a 33rd column to a 1312th column is set as the image window region. The image sensor may output an image with a resolution of 1280×800 through the image window region. In this exemplary implementation, first effective pixels are effective pixels used for actual imaging when a user uses a terminal device, and second effective pixels are effective pixels not used for the actual imaging when the user uses the terminal device. With reference to the image window region, the first effective pixels are effective pixels located in a designated region (e.g., the image window region) of the image sensor, and the second effective pixels are effective pixels located outside the designated region of the image sensor. In an embodiment, the second effective pixels may also be part of the effective pixels located outside the designated region of the image sensor. However, it is easy to understand that, in other exemplary embodiments of this application, if an actual imaging region is configured according to other rules, the first effective pixels are also pixels of the actual imaging region, and the second effective pixels are effective pixels other than the first effective pixels. In an embodiment, the second effective pixels may also be part of the effective pixels other than the first effective pixels. This also belongs to the protection scope of this application.

The technical field usually uses first effective pixels of an image sensor during a process of generating a reference image. On the one hand, this is a long-standing default practice in the technical field, and has become a common operating habit of those skilled in the art. On the other hand, a size of the reference image formed in this way is the same as that of a subsequently formed target image, which is more convenient for related processing and calculation. In this application, the inventor overcomes these technical prejudices, and creatively uses second effective pixels to participate in the generation of the reference image while using the first effective pixels. In this way, the size of the reference image is effectively increased when the cost is not increased, thereby reducing or preventing a depth image from occurring a black edge phenomenon.

In step S420, emit the structured light to a target object, and perform imaging on the target object by using the plurality of first effective pixels, to obtain a target image.

In this exemplary implementation, the target object may be a face or another object on which imaging is to be performed. The electronic device may emit a beam of the structured light in the encoding form of a speckle, a spot, a stripe, a two-dimensional pattern, or the like to the target object by using the structured light projection module 101. The beam of the structured light emitted to the target object needs to be consistent with the beam of the structured light used when generating the reference image. Then, imaging is performed on the target object by using the plurality of first effective pixels of the image sensor. The image window region is usually preset before the delivery of the terminal device. Therefore, during the use process, the terminal device reads a configuration file related to the image window region, to automatically determine the plurality of first effective pixels.

In step S430, obtain a depth image of the target object according to the target image and the reference image.

Figure 7:
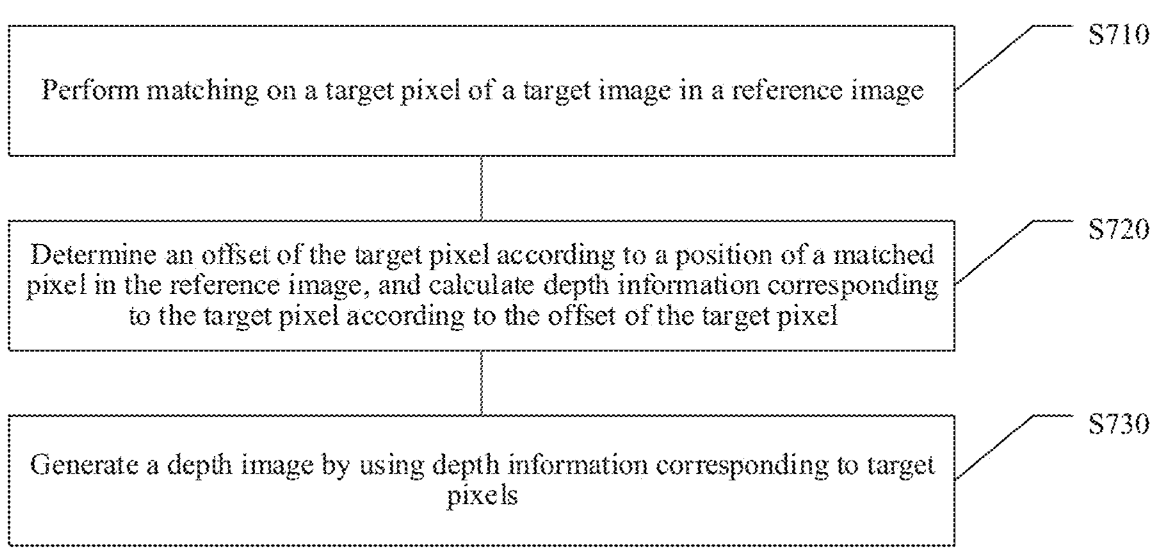
FIG. 7 is a schematic flowchart of steps of obtaining a depth image according to an embodiment of this application.

In this exemplary implementation, the electronic device may read the generated reference image in step S410 from the designated storage position, for example, read the reference image from the memory of the electronic device or the cloud server. After the electronic device obtains the reference image, steps S710 to S730 shown in FIG. 7 may be referred to, to obtain the depth image of the target object.

In step S710, perform matching on a target pixel of the target image in the reference image.

Figure 8:
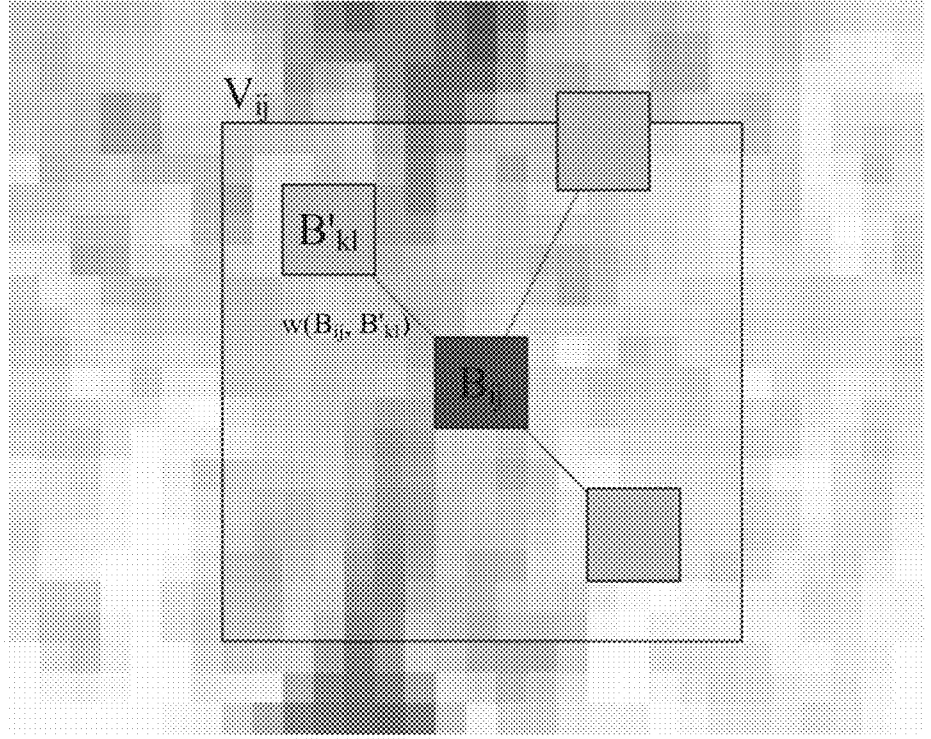
FIG. 8 is a schematic principle diagram of a block matching method according to an embodiment of this application.

In this exemplary implementation, the electronic device may determine a matching pixel corresponding to the target pixel of the target image in the reference image by block matching, matrix matching, or another method. Referring to FIG. 8, by using the block matching method as an example, for a target pixel $P_{ij}$ in a target image, a pixel block $B_{ij}$ with the target pixel $P_{ij}$ as a center and m×n as a size may be extracted as a search pixel block. Then, in a reference image, in a search window $V_{ij}$ with a position corresponding to the target pixel $P_{ij}$ as a center and W×H as a size, a matching pixel block corresponding to the search pixel block $B_{ij}$ is found according to a preset search strategy and a similarity evaluation index. For example, if in the search window $V_{ij}$, a similarity evaluation index $w(B_{ij}, B'_{kl})$ of a pixel block $B'_{kl}$ and the search pixel block $B_{ij}$ is greatest compared to those of other pixel blocks, the pixel block $B'_{kl}$ is determined as a pixel block that matches the search pixel block $B_{ij}$, to determine the matching pixel corresponding to the target pixel $P_{ij}$ in the reference image as $P'_{kl}$, where i and k are both positive integers, and represent rows in which pixels are located; j and l are both positive integers, and represent columns in which the pixels are located; and m, n, W, and H are all positive integers, and W>m and H>n. In addition, other methods such as semi-global block matching (SGBM) may also be used for implementing pixel matching according to requirements. This is not specially limited in this exemplary embodiment.

In addition, to facilitate performing matching and subsequent calculation, binarization processing may alternatively be first performed on the reference image and the target image in this exemplary implementation. However, those skilled in the art can easily understand that the binarization processing is used only in some embodiments. For example, in this application, the binarization processing may be performed on the reference image and the target image through technical means such as a global threshold method, a local threshold method, a dynamic threshold method, a Niblack algorithm, a P-quantile method, an iteration method, an entropy method, and a maximum inter-class variance algorithm, so that values of pixels in the image are 0 or 1.

By using the global threshold method as an example, the electronic device may take an average brightness value of pixels in an entire image region as a threshold, take values of pixels greater than the threshold as 1, and take values of pixels smaller than the threshold as 0. When being applied to indoor depth image generation, the global threshold method has a better effect. By using the local threshold method as an example, for a target image with, for example, 1280×800 pixels, an average brightness value of a region (1, 1, 100, 100) may be first calculated; and in the region, values of pixels greater than the threshold are taken as 1, and values of pixels smaller than the threshold are taken as 0. Then, the same processing is performed on a region (1, 101, 100, 200), and a region (1, 201, 100, 300) to a region (1201, 701, 1280, 800) in order, to complete binarization on the entire image. When being applied to outdoor depth image generation, the local threshold method has a better effect.

In step S720, determine an offset of the target pixel according to a position of a matched pixel in the reference image, and calculate depth information corresponding to the target pixel according to the offset of the target pixel.

Figure 9:
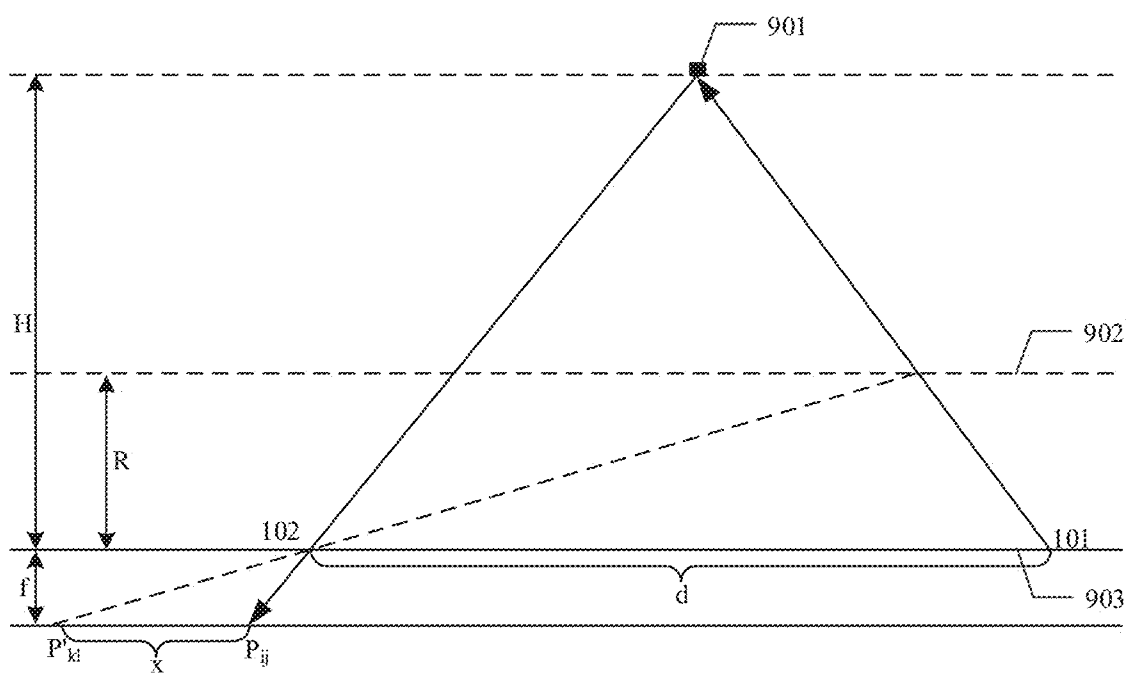
FIG. 9 is a schematic principle diagram of calculating depth information corresponding to a target pixel according to an embodiment of this application.

For example, referring to FIG. 9, a matching pixel corresponding to a target pixel $P_{ij}$ in a reference image is $P'_{kl}$. An offset (namely, an aberration) x of the target pixel may be calculated according to a corresponding position of the matching pixel $P'_{kl}$ and a position of the target pixel Pu in the reference image. Then, a depth H of an imaging point 901 on a target object, namely, a distance between the imaging point 901 on the target object and a terminal device, may be calculated with reference to a triangulation method. For example, $H=R/(1-(R\cdot x)/(f\cdot d))$, where d is a length of a base line (namely, a connection line 903 between a structured light projection module 101 and an image sensor 102), R is a distance between a reference plane 902 and the base line, and f is a focal length of the image sensor 102. Because d, R, and f are fixed constants, the electronic device may calculate and obtain depth information H corresponding to the target pixel after determining the offset x of the target pixel.

Certainly, in other exemplary embodiments of this application, the depth information corresponding to the target pixel may also be calculated through another manner. For example, a mapping table between offsets and depth information of pixels may be pre-established, and the depth information corresponding to the target pixel may be queried and obtained in the mapping table after the offset x of the target pixel is determined. These also belong to the protection scope of this application.

In step S730, generate the depth image by using depth information corresponding to target pixels.

After obtaining the depth information corresponding to the target pixels in step S720, the electronic device may convert the depth information into the depth image. For example, the depth image may be a gray-scale image, a greater gray-scale value of a pixel in the depth image indicates a smaller depth value H, and a smaller gray-scale value indicates a greater depth value H. Alternatively, a greater gray-scale value of the pixel in the depth image indicates a greater depth value H, and a smaller gray-scale value indicates a smaller depth value H. This is not specially limited in this exemplary embodiment. In other exemplary embodiments of this application, the depth image may also exist in the form of an image channel or the like. This also belongs to the protection scope of this application.

By using an image sensor with a model number OV9286 more commonly used in a depth camera as an example, the image sensor has 1328 columns and 1120 rows of effective pixels. A depth image with a resolution of 640×400 or 1280×800 is usually used in the field. Therefore, in the related art, a reference image is generated by using effective pixels of 1280×800 in the image sensor in a generation calibration phase of the depth camera; during actual use, after a structured light projection module emits a beam of structured light to a target object, imaging is performed on the target object using 1280×800 effective pixels in the image sensor to obtain a target image with a resolution of 1280×800; and then, a depth image is generated according to the target image (the resolution being 1280×800) and the reference image (the resolution being 1280×800). However, in this exemplary implementation, the electronic device may generate a reference image by using 1328×1120 effective pixels in the image sensor in the generation calibration phase of the depth camera; during actual use, after a structured light projection module emits a beam of structured light to a target object, the electronic device performs imaging on the target object by using 1280×800 effective pixels in the image sensor, to obtain a target image with a resolution of 1280×800; and then, a depth image is generated according to the target image (the resolution being 1280×800) and the reference image (the resolution being 1328×1120), thereby reducing or removing a black edge.

Figure 10:
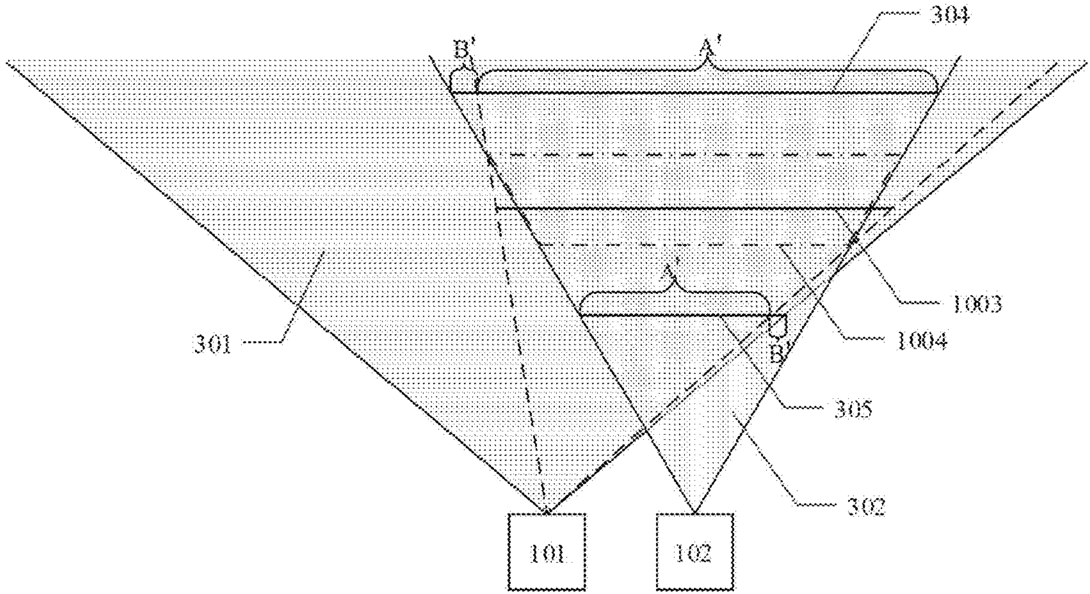
FIG. 10 is a schematic principle diagram of occurring a black edge phenomenon according to an embodiment of this application.

FIG. 10 is a schematic principle diagram of a depth image generation method in this exemplary implementation. Similar to FIG. 3, an emergent light range of a structured light projection module 101 is a region 301, and an incident light range of an image sensor 102 is a region 302. Pixels of a region A' of a target image 304 and a region A' of a target image 305 may match corresponding pixels in a reference image 1003, that is, corresponding depth information may be determined. The regions A' are much greater than regions A in FIG. 3. Pixels of a region B' of the target image 304 and a region B' of the target image 305 do not exist in the reference image 1003, that is, corresponding depth information cannot be determined. Therefore, in the finally generated depth image, positions corresponding to the region B' of the target image 304 and the region B' of the target image 305 are black edges. Regions B' are much smaller than regions B' in FIG. 3. In addition, in part of regions, for example, a region corresponding to a dashed box 1004 in FIG. 10, all regions of the target image may match corresponding pixels in the reference image 1003, that is, corresponding depth information may be determined. Therefore, occurrence of a black edge phenomenon is fully avoided in the region corresponding to the dashed box 1004.

It can be seen from the above, the depth image generation method in this exemplary implementation can actually reduce or prevent a depth image from occurring the black edge phenomenon to a certain extent, thereby optimizing application of the depth image in some fields. By using an applied depth camera or another terminal device with a depth photographing function as an example, the depth image generation method in this exemplary implementation can increase an FOV when acquiring a depth image to a certain extent, thereby improving the quality of the depth image. If face authentication is performed by using the depth camera or the another terminal device with the depth photographing function, an FOV during the face authentication can be increased to a certain extent, to reduce authentication failures due to a black edge in the depth image, thereby improving user experience.

In addition, because the depth image generation method provided in this exemplary implementation uses known second effective pixels and does not change hardware, that is, the depth image generation method provided in this exemplary implementation of this application cannot generate additional optimization costs. Meanwhile, the application scope of the depth image generation method provided in this exemplary implementation is also increased.

In another exemplary embodiment of this application, to reduce the amount of matching operations in step S710, further improvements are performed based on the depth image generation method. Specifically, in step S410, the electronic device may perform imaging on the reference plane by using the plurality of first effective pixels and different quantities of second effective pixels of the image sensor, to obtain a plurality of reference images with different sizes, where the plurality of reference images with different sizes are at least two reference images with different sizes.

For example, by using the image sensor in FIG. 6 as an example, where pixels from a 33rd column to a 1312th column and from a 169th row to a 968th row are first effective pixels; and pixels from a 9th column to a 32nd column, from a 1313th column to a 1336th column, from a 9th row to a 168th row, and from a 969th row to a 1128th row are second effective pixels. In this exemplary implementation, for example, a first reference image may be generated by using pixels from the 9th column to the 1336th column and from the 9th row to the 1128th row, namely, all the first effective pixels and all the second effective pixels; and a second reference image may be generated by using pixels from a 21st column to a 1324th column and from an 89th row to a 1048th, namely, part of the first effective pixels and part of the second effective pixels.

After a plurality of reference images are generated, a selected reference image may be determined from the plurality of reference images according to a designated rule, and a depth image of a target object may be obtained according to a target image and the selected reference image. For example, a distance from the target object to the reference plane may be first obtained; and then, the selected reference image may be determined from the plurality of reference images according to the distance from the target object to the reference plane. For example, In this exemplary implementation, when depth information is acquired on the target image, a distance between the target object and a reference terminal device may be determined by using a laser ranging module or another distance sensor set in a terminal device. Because a distance from the terminal device to the reference plane is a fixed value, the distance from the target object to the reference plane may be approximately determined after the distance between the target object to the reference terminal device is determined. It can be seen from FIG. 3 and FIG. 10, a closer distance between a plane in which the target object is located and a reference plane indicates a smaller black edge range, and a farther distance between the plane in which the target object is located and the reference plane indicates a greater black edge range. Therefore, in this exemplary implementation, a size of the selected reference image is positively correlated with the distance from the target object to the reference plane, that is, a greater distance from the target object to the reference plane correspondingly indicates a greater size of the selected reference image.

Therefore, when the distance between the plane in which the target object is located and the reference plane is greater, for example, the first reference image may be determined as the selected reference image; and when the distance between the plane in which the target object is located and the reference plane is smaller, for example, the second reference image may be determined as the selected reference image. In this way, the amount of operations during matching can be effectively reduced. By using the block matching method as an example, the algorithm complexity of the method is proportional to O (N, M, W, H, m, n), where N and M are respectively row number and column number of the reference image (reference of other parameters is similar to the foregoing description). Therefore, compared with all using the first reference image, when the second reference image with a smaller size is used, the algorithm complexity during matching can be effectively reduced, thereby reducing the amount of operations.

In other exemplary embodiments of this application, a plurality of reference images may also be generated through another manner. By still using the image sensor in FIG. 6 as an example, for example, a first reference image may be generated by using pixels from a 9th column to a 1312nd column and from a 169th row to a 968th row; a second reference image may be generated by using pixels from a 33rd column to a 1336th column and from the 169th row to the 968th row; a third reference image may be generated by using pixels from the 33rd column to the 1312nd column and from a 9th row to the 968th row; and a fourth reference image may be generated by using pixels from the 33rd column to the 1312nd column and from the 169th row to a 1128th row.

Meanwhile, a selected reference image may be determined from the plurality of reference images through another manner. For example, a position of a target object in a target image may be first determined. For example, the position of the target object in the target image may be determined through a foreground image extraction method or another method. Then, the selected reference image may be determined from the plurality of reference images according to the position of the target object in the target image. For example, In this exemplary implementation, after the target image is obtained, if the position of the target object in the target image is to left, it may have a greater impact if a left edge of a depth image has a black edge phenomenon, and it may also have a smaller impact even if other positions have a black edge. Based on this, the first reference image may be determined as the selected reference image. Similarly, if the position of the target object in the target image is to right, the second reference image may be determined as the selected reference image; if the position of the target object in the target image is to upper, the third reference image may be determined as the selected reference image; and if the position of the target object in the target image is to lower, the fourth reference image may be determined as the selected reference image. Compared with using all reference images of a greatest size, when the first to fourth reference images with smaller sizes are used, the algorithm complexity during matching can also be effectively reduced, thereby reducing the amount of operations.

Figure 11:
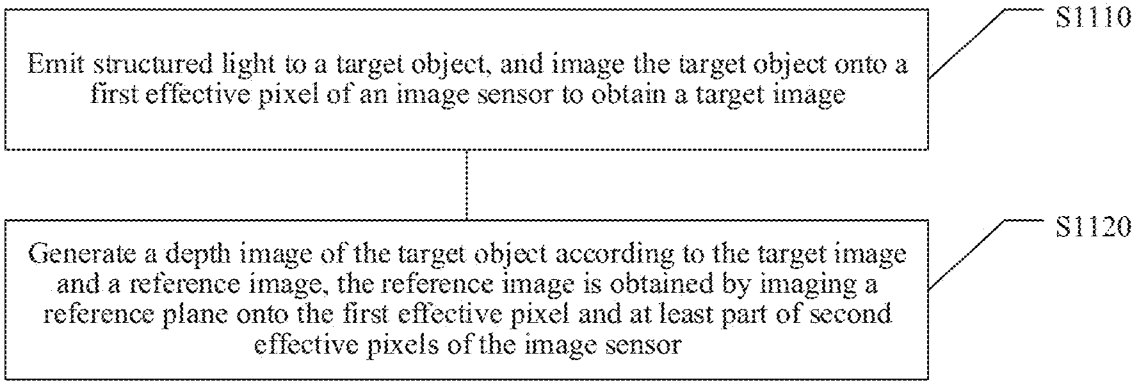
FIG. 11 is a schematic flowchart of a depth image generation method according to an embodiment of this application.

This application further provides a depth image generation method. Referring to FIG. 11, the method may include the following steps S1110 to S1120.

In step S1110, emit structured light to a target object, and perform imaging on the target object by using a plurality of first effective pixels of an image sensor, to obtain a target image.

In step S1120, obtain a depth image of the target object according to the target image and a reference image. the reference image being obtained by performing imaging on a reference plane by using the plurality of first effective pixels and a plurality of second effective pixels of the image sensor.

This application further provides a reference image generation method. This method includes: emitting structured light to a reference plane, and performing imaging on the reference plane by using a plurality of first effective pixels and a plurality of second effective pixels of an image sensor, to obtain a reference image, the plurality of first effective pixels being an effective pixel used when deep imaging is performed on a target object.

Specific details of the steps in the depth image generation method and the reference image generation method have been specifically described in the foregoing exemplary embodiments. Therefore, details are not described herein again.

Although the steps of the method in this application are described in a specific order in the accompanying drawings, this does not require or imply that the steps have to be performed in the specific order, or all the steps shown have to be performed to achieve an expected result. Additionally or alternatively, some steps may be omitted, a plurality of steps are combined into one step, and/or one step is decomposed into a plurality of steps for execution, and the like.

Figure 12:
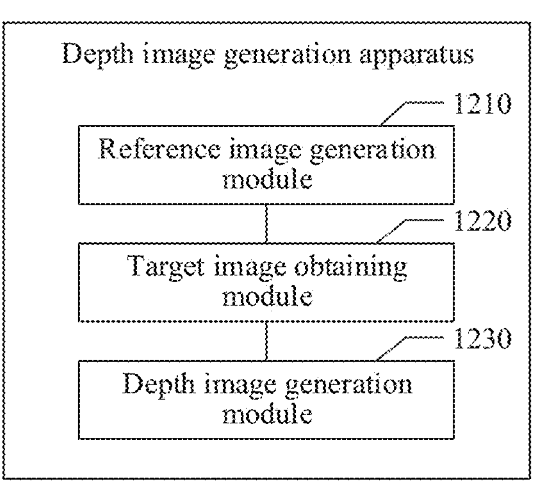
FIG. 12 is a schematic block diagram of a depth image generation apparatus according to an embodiment of this application.

Further, in an exemplary implementation, a depth image generation apparatus is further provided. Referring to FIG. 12, a depth image generation apparatus 1200 may include a reference image generation module 1210, a target image obtaining module 1220, and a depth image generation module 1230.

The reference image generation module 1201 may be configured to emit structured light to a reference plane, and perform imaging on the reference plane by using a plurality of first effective pixels and a plurality of second effective pixels of an image sensor, to obtain a reference image. The target image obtaining module 1220 may be configured to emit the structured light to a target object, and perform imaging on the target object by using the plurality of first effective pixels, to obtain a target image. The depth image generation module 1230 may be configured to obtain a depth image of the target object according to the target image and the reference image.

In an exemplary embodiment of this application, the first effective pixel is an effective pixel located in a designated region of the image sensor; and the second effective pixel is an effective pixel located outside the designated region of the image sensor.

In an exemplary embodiment of this application, the reference image generation module 1210 performs imaging on the reference plane by using the plurality of first effective pixels and all second effective pixels of the plurality of second effective pixels of the image sensor.

In an exemplary embodiment of this application, the reference image generation module 1210 performs imaging on the reference plane by using the plurality of first effective pixels and different quantities of second effective pixels of the image sensor, to obtain at least two reference images with different sizes. The depth image generation module 1230 determines a selected reference image from the at least two reference images with different sizes, and obtains the depth image of the target object according to the target image and the selected reference image.

In an exemplary embodiment of this application, the depth image generation module 1230 specifically determines the selected reference image from the at least two reference images with different sizes through the following manners: obtaining a distance from the target object to the reference plane; and determining the selected reference image from the at least two reference images with different sizes according to the distance from the target object to the reference plane.

In an exemplary embodiment of this application, a size of the selected reference image is positively correlated with the distance from the target object to the reference plane.

In an exemplary embodiment of this application, the depth image generation module 1230 specifically determines the selected reference image from the at least two reference images with different sizes through the following steps: determining a position of the target object in the target image; and determining the selected reference image from the at least two reference images with different sizes according to the position of the target object in the target image.

In an exemplary embodiment of this application, the apparatus further includes: an image storage module, configured to pre-store the reference image in a designated storage position. The depth image generation module 1230 reads the reference image from the designated storage position, and obtains the depth image of the target object according to the target image and the read reference image.

In an exemplary embodiment of this application, the depth image generation module 1230 specifically obtains the depth image of the target object through the following steps: performing matching on a target pixel of the target image in the reference image; determining an offset of the target pixel according to a position of a matched pixel in the reference image; calculating depth information corresponding to the target pixel according to the offset of the target pixel; and generating the depth image by using depth information corresponding to target pixels.

In an exemplary embodiment of this application, before the performing matching on a target pixel of the target image in the reference image, the depth image generation module 1230 further performs binarization processing on the reference image and the target image.

According to one aspect of this application, a depth image generation apparatus is provided, including: a target image obtaining module, configured to emit structured light to a target object, and perform imaging on the target object by using a plurality of first effective pixels of an image sensor, to obtain a target image; and a depth image generation module, configured to obtain a depth image of the target object according to the target image and a reference image, the reference image being obtained by performing imaging on a reference plane by using the plurality of first effective pixels and a plurality of second effective pixels of the image sensor.

According to one aspect of this application, a reference image generation apparatus is provided, including: a reference image generation module, configured to emit structured light to a reference plane, and perform imaging on the reference plane by using a plurality of first effective pixels and a plurality of second effective pixels of an image sensor, to obtain a reference image, the plurality of first effective pixels being an effective pixel used when deep imaging is performed on a target object.

Details of the modules or units in the depth image generation apparatus and the reference image generation apparatus have been specifically described in the corresponding depth image generation methods. Therefore, details are not described herein again.

Figure 13:
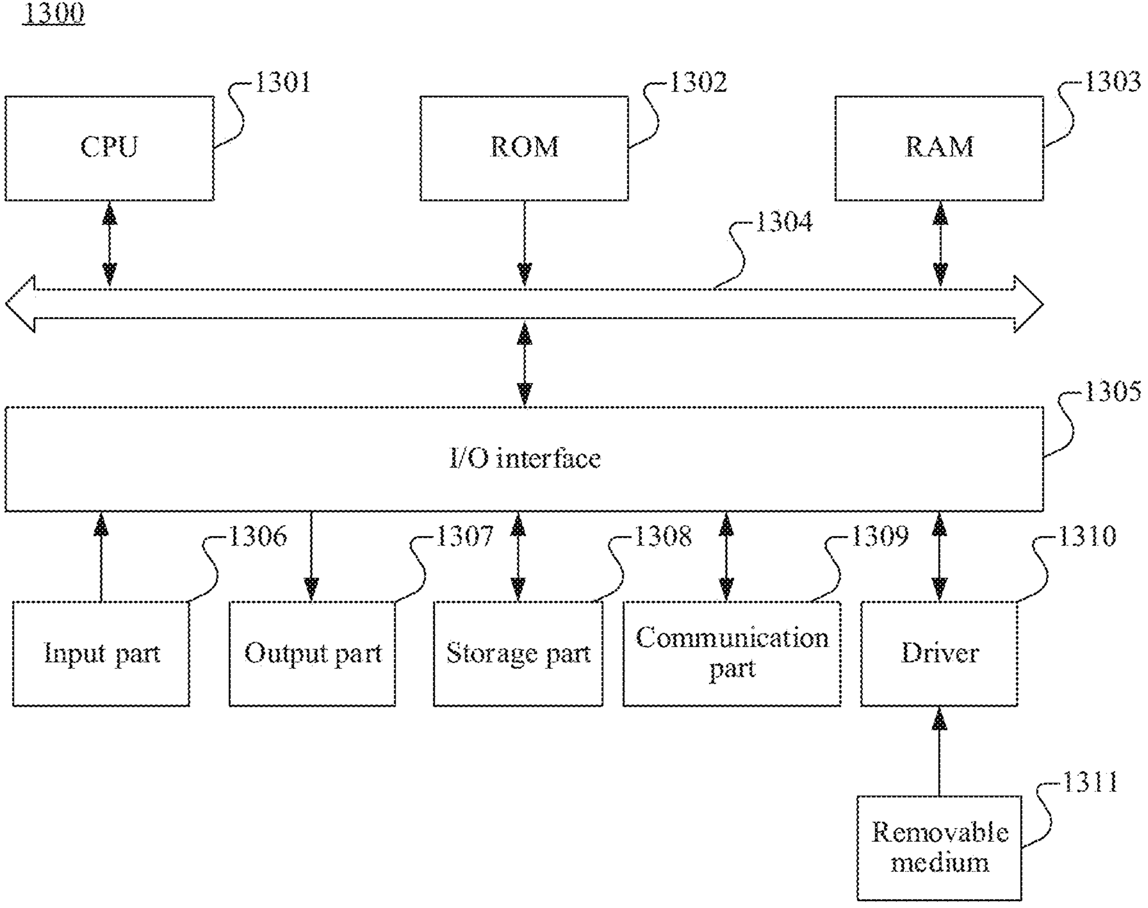
FIG. 13 is a schematic structural diagram of a computer system adapted to implement an electronic device according to an embodiment of this application.

FIG. 13 is a schematic structural diagram of a computer system adapted to implement an electronic device according to an embodiment of this application.

A computer system 1300 of the electronic device shown in FIG. 13 is merely an example, and does not constitute any limitation on functions and use ranges of the embodiments of this application.

As shown in FIG. 13, the computer system 1300 includes a central processing unit (CPU) 1301, which can perform various appropriate actions and processing according to a program stored in a read-only memory (ROM) 1302 or a program loaded into a random access memory (RAM) 1303 from a storage part 1308. The RAM 1303 further stores various programs and data required for system operations. The CPU 1301, the ROM 1302, and the RAM 1303 are connected to each other by using a bus 1304. An input/output (I/O) interface 1305 is also connected to the bus 1304.

The following components are connected to the I/O interface 1305 includes: an input part 1306 including a keyboard, a mouse, or the like; an output part 1307 including a cathode ray tube (CRT), a liquid crystal display (LCD), a speaker, and the like; the storage part 1308 including hard disk, or the like; and a communication part 1309 including a network interface card such as an LAN card, a modem, or the like. The communication portion 1309 performs communication processing by using a network such as the Internet. A driver 1310 is also connected to the I/O interface 1305 according to requirements. A removable medium 1311, such as a magnetic disk, an optical disc, a magneto-optical disk, or a semiconductor memory, is installed on the drive 1310 according to requirements, so that a computer program read from the removable medium is installed into the storage part 1308 according to requirements.

Particularly, according to an embodiment of this application, the processes described in the following by referring to the flowcharts may be implemented as computer software programs. For example, an embodiment of this application includes a computer program product. The computer program product includes a computer program hosted on a computer-readable medium. The computer program includes program code for performing the method shown in the flowchart. In such an embodiment, the computer program may be downloaded and installed from the network through the communication portion 1309, and/or installed from the removable medium 1311. When the computer program is executed by the CPU 1301, various functions defined in the method and apparatus of this application are executed.

In another aspect, this application further provides a computer-readable medium. The computer-readable medium may be included in the electronic device described in the above embodiments, or may exist alone without being assembled into the electronic device. The computer-readable medium carries one or more programs, the one or more programs, when executed by the electronic device, causing the electronic device to implement the method described in the following embodiment. For example, the electronic device may implement the steps shown in FIG. 4 to FIG. 9.

The computer-readable medium shown in this application may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM or a flash memory), an optical fiber, a compact disk read-only memory (CD-ROM), an optical storage device, a magnetic storage device, or any appropriate combination thereof. In this application, the computer-readable storage medium may be any tangible medium containing or storing a program, and the program may be used by or used in combination with an instruction execution system, an apparatus, or a device. In this application, a computer-readable signal medium may include a data signal being in a baseband or propagated as a part of a carrier wave, the data signal carrying computer-readable program code. Such a propagated data signal may be in a plurality of forms, including but not limited to an electromagnetic signal, an optical signal, or any suitable combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The program code contained in the computer-readable medium may be transmitted by using any appropriate medium, including but not limited to: a wireless medium, a wire, an optical cable, RF, any suitable combination thereof, or the like.

The flowcharts and block diagrams in the accompanying drawings illustrate possible system architectures, functions, and operations that may be implemented by a system, a method, and a computer program product according to various embodiments of this application. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

It is to be understood that this application is not limited to the accurate structures that are described in the foregoing and that are shown in the accompanying drawings, and modifications and changes may be made without departing from the scope of this application. The scope of this application is limited by the appended claims only.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs a depth image generation method. In practical application, the foregoing functions may be allocated to and completed by different functional modules according to requirements, that is, an inner structure of a device is divided into different functional modules to implement all or a part of the functions described above.

What is claimed is:

1. A depth image generation method, performed by an electronic device, the method comprising:

emitting structured light from a light emitter to a reference plane;

imaging the reference plane onto a plurality of first effective pixels and a plurality of second effective pixels of an image sensor to obtain a reference image, wherein the plurality of first effective pixels is positioned in a center region of the image sensor, and the plurality of second effective pixels is positioned surrounding the center region, wherein the light emitter and the image sensor define a base line;

emitting the structured light from the light emitter to a target object;

imaging the target object onto the plurality of first effective pixels to obtain a target image;

matching a respective one of the plurality of first effective pixels in the target image with a corresponding one of the plurality of second effective pixels in the reference image;

determining an offset x between a position of the respective one of the plurality of first effective pixels in the reference image and a corresponding position of the corresponding matching one of the plurality of second effective pixels in the reference image; and generating a depth image of the target object based on the offset x between the respective one of the plurality of first effective pixels in the target image and the corresponding matching one of the plurality of second effective pixels in the reference image and a connection line d between the light emitter and the image sensor on the base line and a distance R between the reference plane and the base line and a focal length f of the image sensor, wherein the depth image of the target object provides a depth H of an imaging point on the target object based on ratios between the distance R, a product of the focal length f and the connection line d, and a product of the distance R and the offset x.

2. The method according to claim 1, wherein the plurality of first effective pixels is positioned in a designated region that is an image window region of the image sensor.

3. The method according to claim 1, wherein imaging the reference plane onto the plurality of first effective pixels and the plurality of second effective pixels of the image sensor comprises:

imaging the reference plane onto the plurality of first effective pixels and all of the plurality of second effective pixels of the image sensor.

4. The method according to claim 1, wherein imaging the reference plane onto the plurality of first effective pixels and the plurality of second effective pixels of the image sensor comprises:

imaging the reference plane onto the plurality of first effective pixels and different quantities of second effective pixels in the plurality of second effective pixels of the image sensor to obtain at least two reference images with different sizes; and generating the depth image of the target object based on the target image and the reference image comprises:

selecting a reference image from the at least two reference images with different sizes, and generating the depth image of the target object according to the target image and the selected reference image.

5. The method according to claim 4, wherein selecting the reference image from the at least two reference images with different sizes comprises:

obtaining a distance from the target object to the reference plane; and selecting a reference image from the at least two reference images with different sizes according to the distance.

6. The method according to claim 5, wherein a size of the selected reference image is positively correlated with the distance.

7. The method according to claim 4, wherein selecting the reference image from the at least two reference images with different sizes comprises:

determining a position of the target object in the target image; and determining the selected reference image from the at least two reference images with different sizes according to the position of the target object in the target image.

8. The method according to claim 1, further comprising:

pre-storing the reference image in a designated storage position as a stored reference image, and wherein generating the depth image of the target object based on the target image and the reference image comprises:

reading the reference image from the designated storage position, and generating the depth image of the target object according to the target image and the stored reference image.

9. The method according to claim 8, further comprising:

prior to matching a target pixel of the target image to a matched pixel in the reference image:

performing binarization processing on the reference image and the target image.

10. The method of claim 1, wherein the plurality of first effective pixels is an effective pixel used when depth imaging is performed on the target object.

11. An electronic device, comprising:

one or more processors; and memory storing one or more programs, the one or more programs comprising instructions that, when executed by the one or more processors, cause the one or more processors to perform operations comprising:

emitting structured light from a light emitter to a reference plane;

imaging the reference plane onto a plurality of first effective pixels and a plurality of second effective pixels of an image sensor to obtain a reference image, wherein the plurality of first effective pixels is positioned in a center region of the image sensor, and the plurality of second effective pixels is positioned surrounding the center region, and wherein the light emitter and the image sensor define a base line;

emitting the structured light to a target object;

imaging on the target object onto the plurality of first effective pixels to obtain a target image;

matching a respective one of the plurality of first effective pixels in the target image with a corresponding one of the plurality of second effective pixels in the reference image;

determining an offset x between a position of the respective one of the plurality of first effective pixels in the reference image and a corresponding position of the corresponding matching one of the plurality of second effective pixels in the reference image; and generating a depth image of the target object based on the offset x between the respective one of the plurality of first effective pixels in the target image and the corresponding matching one of the plurality of second effective pixels in the reference image and a connection line d between the light emitter and the image sensor on the base line and a distance R between the reference plane and the base line and a focal length f of the image sensor, wherein the depth image of the target object provides a depth H of an imaging point on the target object based on ratios between the distance R, a product of the focal length f and the connection line d, and a product of the distance R and the offset x.

12. The electronic device according to claim 11, wherein imaging the reference plane onto the plurality of first effective pixels and the plurality of second effective pixels of the image sensor comprises:

imaging the reference plane onto the plurality of first effective pixels and all of the plurality of second effective pixels of the image sensor.

13. The electronic device according to claim 11, wherein imaging the reference plane onto the plurality of first effective pixels and the plurality of second effective pixels of the image sensor comprises:

imaging the reference plane onto the plurality of first effective pixels and different quantities of second effective pixels in the plurality of second effective pixels of the image sensor to obtain at least two reference images with different sizes; and generating the depth image of the target object based on the target image and the reference image comprises:

selecting a reference image from the at least two reference images with different sizes, and generating the depth image of the target object according to the target image and the selected reference image.

14. The electronic device according to claim 13, wherein selecting the reference image from the at least two reference images with different sizes comprises:

obtaining a distance from the target object to the reference plane; and selecting a reference image from the at least two reference images with different sizes according to the distance.

15. The electronic device according to claim 11, further comprising:

pre-storing the reference image in a designated storage position as a stored reference image, and wherein generating the depth image of the target object based on the target image and the reference image comprises:

reading the reference image from the designated storage position, and generating the depth image of the target object according to the target image and the stored reference image.

16. A non-transitory computer-readable storage medium, storing a computer program, the computer program, when executed by one or more processors of an electronic device, cause the one or more processors to perform operations comprising:

emitting structured light from a light emitter to a reference plane;

imaging the reference plane onto a plurality of first effective pixels and a plurality of second effective pixels of an image sensor to obtain a reference image, wherein the plurality of first effective pixels is positioned in a center region of the image sensor, and the plurality of second effective pixels is positioned surrounding the center region, and wherein the light emitter and the image sensor define a base line;

emitting the structured light to a target object;

imaging on the target object onto the plurality of first effective pixels to obtain a target image;

matching a respective one of the plurality of first effective pixels in the target image with a corresponding one of the plurality of second effective pixels in the reference image;

determining an offset x between a position of the respective one of the plurality of first effective pixels in the reference image and a corresponding position of the corresponding matching one of the plurality of second effective pixels in the reference image; and generating a depth image of the target object based on the offset x between the respective one of the plurality of first effective pixels in the target image and the corresponding matching one of the plurality of second effective pixels in the reference image and a connection line d between the light emitter and the image sensor on the base line and a distance R between the reference plane and the base line and a focal length f of the image sensor, wherein the depth image of the target object provides a depth H of an imaging point on the target object based on ratios between the distance R, a product of the focal length f and the connection line d, and a product of the distance R and the offset x.

17. The non-transitory computer-readable storage medium according to claim 16, further comprising:

pre-storing the reference image in a designated storage position as a stored reference image, and wherein generating the depth image of the target object based on the target image and the reference image comprises:

reading the reference image from the designated storage position, and generating the depth image of the target object according to the target image and the stored reference image.

* * * * *